Patented Nov. 4, 1930

1,780,197

UNITED STATES PATENT OFFICE

HANS LEHRECKE, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF DELAWARE

METHOD OF CAUSING THE SIMULTANEOUS EVOLUTION OF HYDROCYANIC ACID AND AN IRRITANT GAS

No Drawing. Application filed October 20, 1925, Serial No. 63,789, and in Germany October 31, 1924.

The use of hydrocyanic acid for the destruction of pests in enclosed spaces has previously been accompanied with considerable danger since the odor of hydrocyanic acid is not easily detected by the ordinary operator. For this reason the use of hydrocyanic acid has been considerably limited. Recently, however, it has been proposed to employ with the hydrocyanic acid such gases as are irritant to the eyes and nose but much less toxic to men and animals than is the hydrocyanic acid. I have disclosed in my accompanying application Serial Number 63,787 filed of even date herewith the use of addition compounds of hydrocyanic acid with metallic salts such as iron chloride, aluminum chloride, etc. for the evolution of hydrocyanic acid. I have now discovered that it is possible to develop from these hydrocyanic acid addition products, simultaneously, hydrocyanic acid and irritant materials. In order to do this the hydrocyanic acid addition compounds are treated with materials which by reaction on hydrocyanic acid will form for example cyanogen chloride, cyanogen bromide, or the like. For this purpose calcium hypochlorite, sodium hypochlorite, magnesium hypochlorite, bleaching powder and the like are of special importance. The presence of such materials in the mixtures of hydrocyanic acid addition products is of importance in the transportation of these materials. For example should the container become broken in any way and hydrocyanic acid evolved, because of contact with air, warning is immediately given by the simultaneous evolution of the irritant gases. So likewise when these materials are used in fumigation or treatment of rooms, the presence of the lethal hydrocyanic acid is always accompanied by the highly irritant gases thus affording a warning against premature entrance to the room.

Instead of using mixtures of these materials the components can also be used separately in that the hydrocyanic acid addition body and the irritant forming material are carried about separately and then mixed in the generating vessel. Another method for the attainment of the desired effect is that aqueous solutions of the irritant forming substance are used in place of pure water for the evolution of hydrocyanic acid. Thus the hydrocyanic acid addition product can be treated with a solution of calcium hypochlorite or a solution and suspension of bleaching powder. In a similar manner it is also possible to use chlorine water or bromine water or one could also use gaseous chlorine by bubbling it thru the solution.

The ratio of irritant gas to the hydrocyanic acid may be of variable quantity, but the amount of irritant must be so adjusted so that as long as any lethal quantities of hydrocyanic acid are present in the room or chamber there will always be a sufficient amount of the irritant to give the necessary warning.

Claims:

1. Method of causing the simultaneous evolution of hydrocyanic acid and an irritant gas which consists in treating with water a mixture containing an hydrocyanic acid addition product of a metallic salt, a salt of high heat of hydration and solution and a salt capable of reacting with hydrocyanic acid to form said irritant.

2. Method of fumigating which comprises placing in the room to be treated and in contact with the moisture of the air a mixture of an addition product of HCN with a hygroscopic metallic salt having a high heat of hydration and solution and a hypochlorite.

3. Process for the evolution of mixtures of hydrocyanic acid and cyanogen chloride which consists in forming a mixture of an addition product of hydrocyanic acid with a metallic salt having a high heat of hydration and solution and a hypochlorite and treating said mixture with water.

4. Method of causing the simultaneous evolution of hydrocyanic acid and cyanogen chloride which consists in treating with water a mixture containing an hydrocyanic acid addition product of iron chloride, excess iron chloride and sodium hypochlorite.

5. A product which on treatment with water will cause the simultaneous evolution of hydrocyanic acid and an irritant gas containing a mixture of an hydrocyanic acid addition product of a metallic salt and a salt capable of reacting with hydrocyanic acid to form said irritant.

6. A product for the simultaneous evolution of hydrocyanic acid and cyanogen chloride containing a mixture of an hydrocyanic acid addition product of a metallic salt and a salt containing chlorine capable of reacting with hydrocyanic acid to form cyanogen chloride.

7. A product for the simultaneous evolution of hydrocyanic acid and cyanogen chloride containing a mixture of an addition product of hydrocyanic acid with a metallic salt and a hypochlorite.

8. A product for the simultaneous evolution of hydrocyanic acid and cyanogen chloride containing a mixture of an addition product of hydrocyanic acid and iron chloride with sodium hypochlorite.

Signed at Frankfort-on-the-Main, Germany, this 30th day of September, A. D. 1925.

Dr. HANS LEHRECKE.